Aug. 5, 1958     A. R. BAFFREY ET AL     2,846,554
BUTT WELDING OF METAL TUBES
Filed Nov. 28, 1955     6 Sheets-Sheet 1
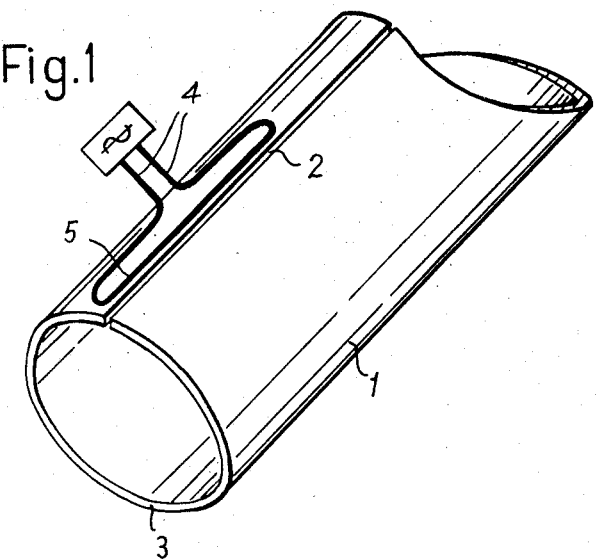
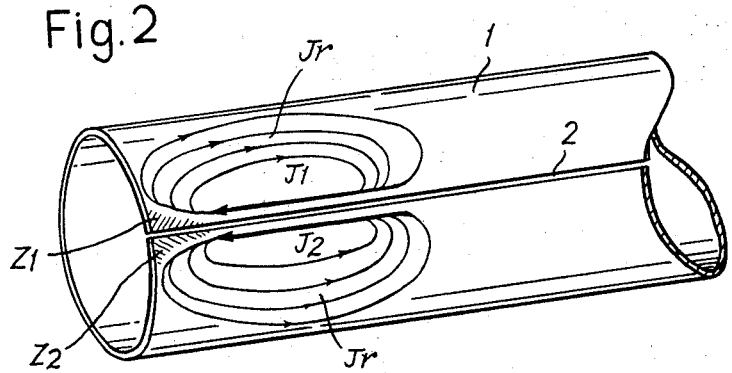
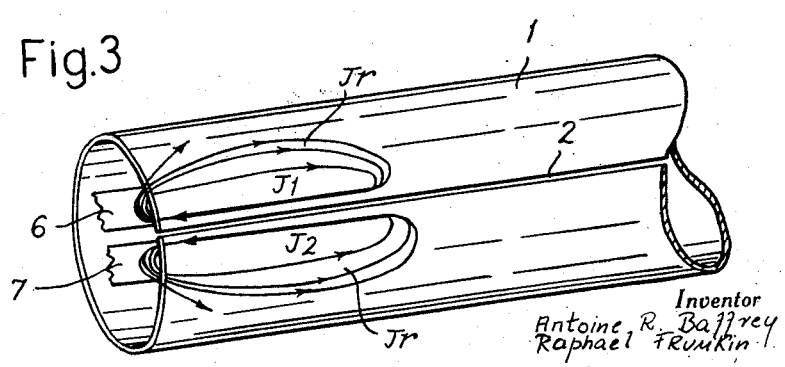
Inventor
Antoine R. Baffrey
Raphael Frumkin
By
Holcombe, Wetherill & Brisebois Attorney

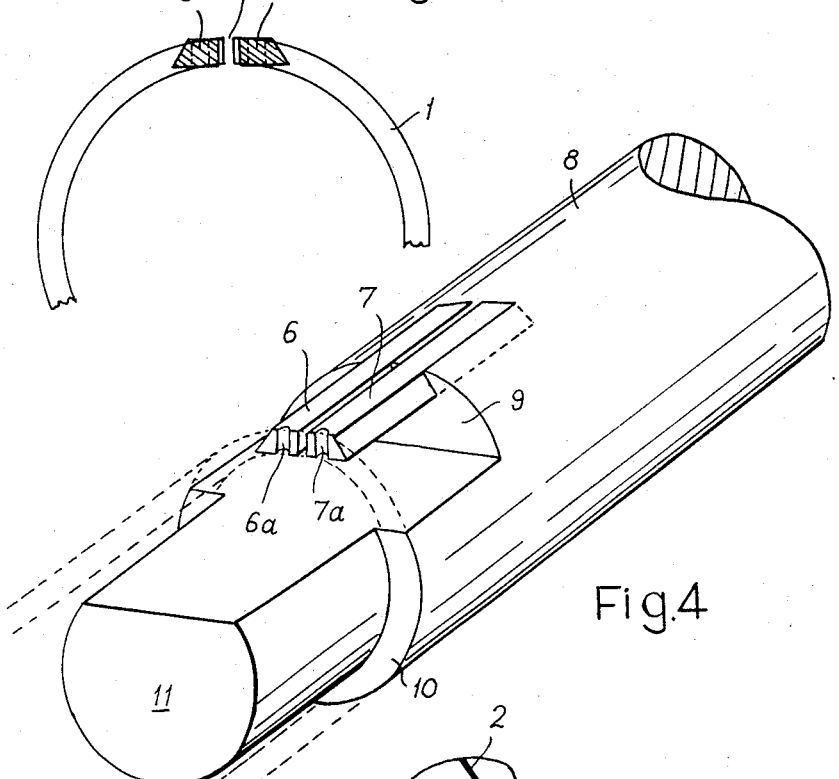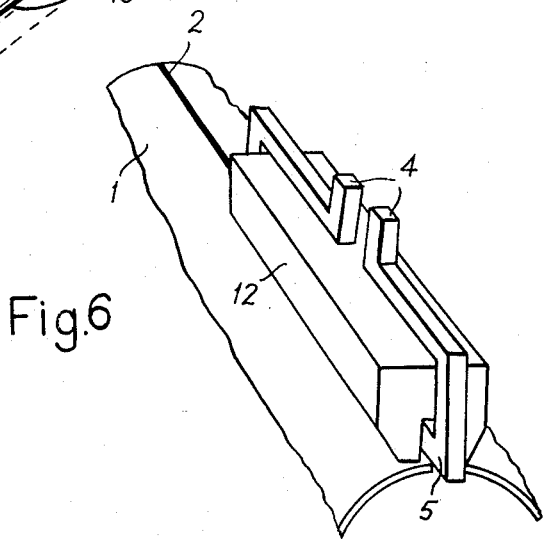

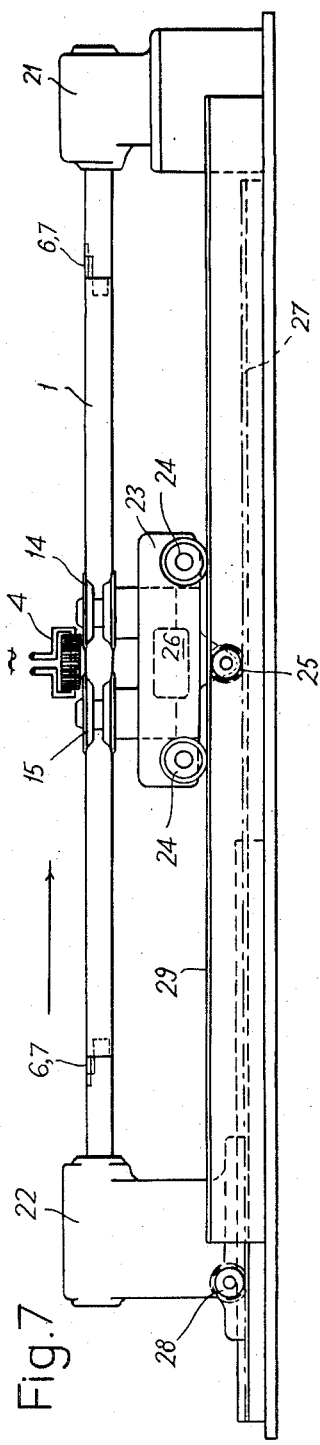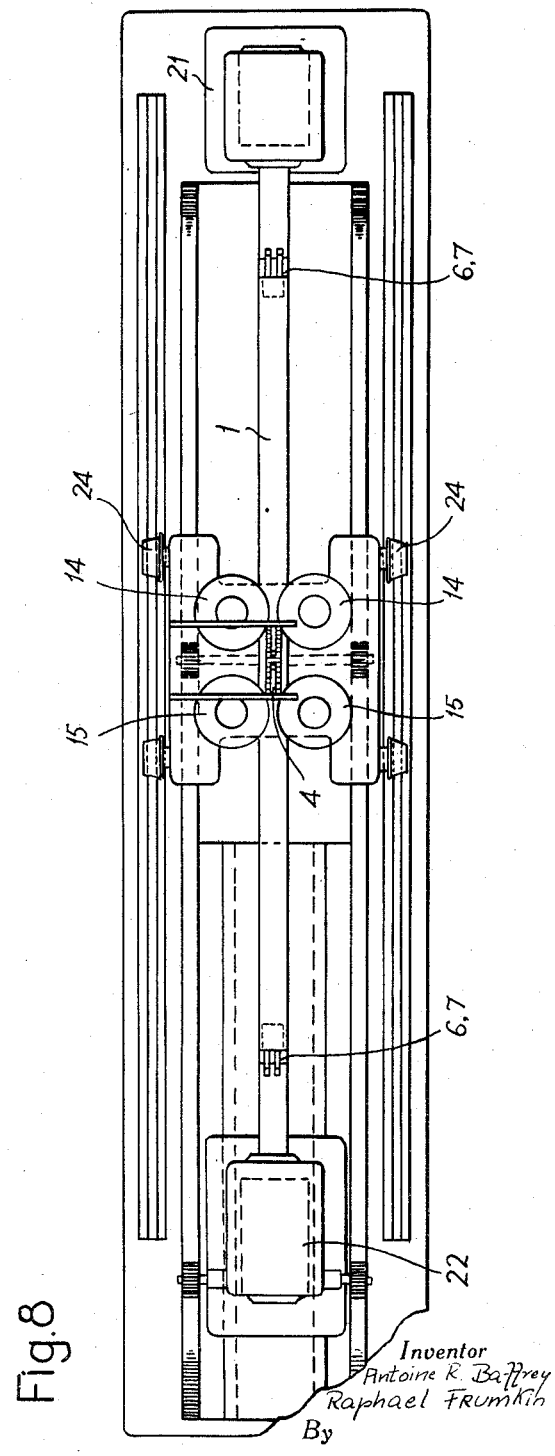

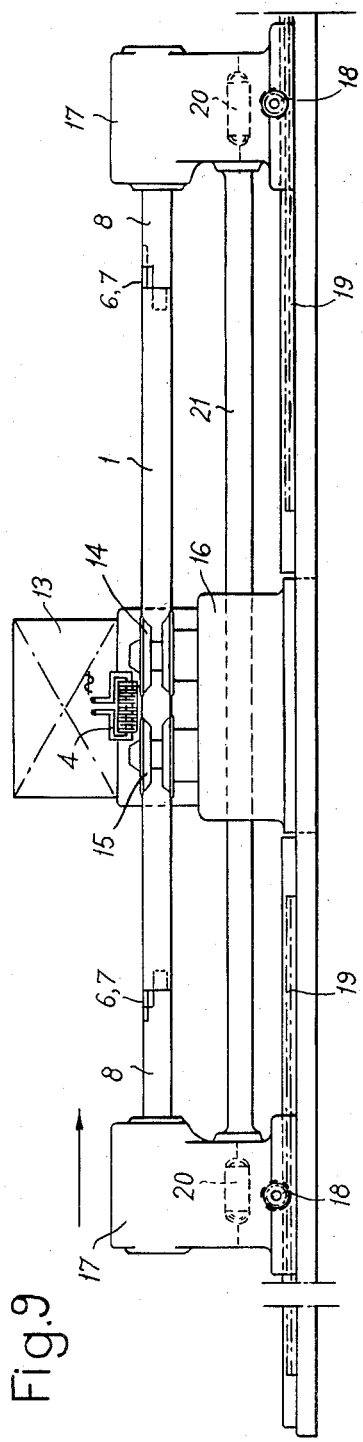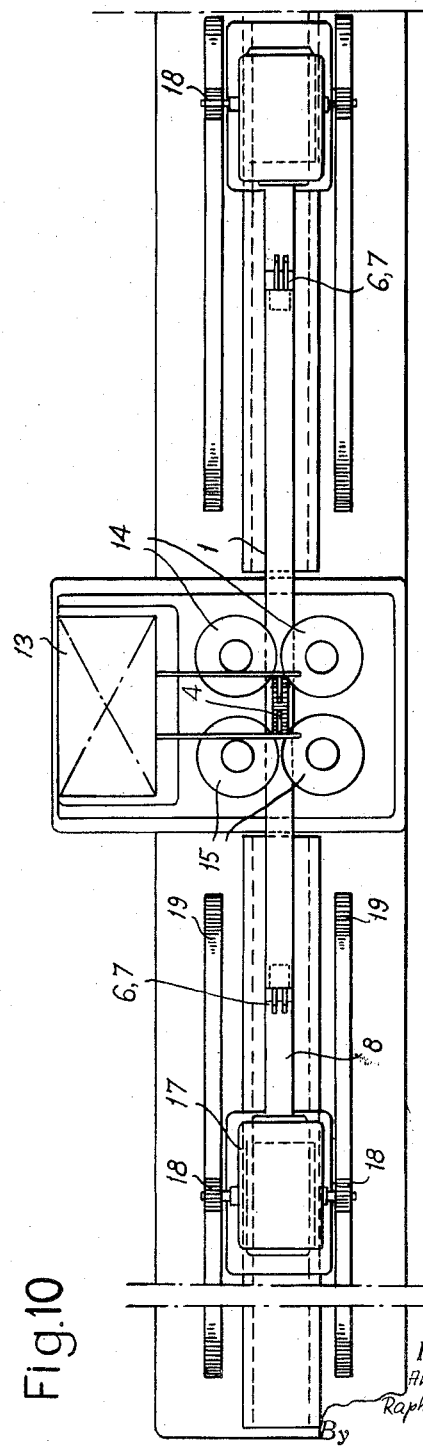

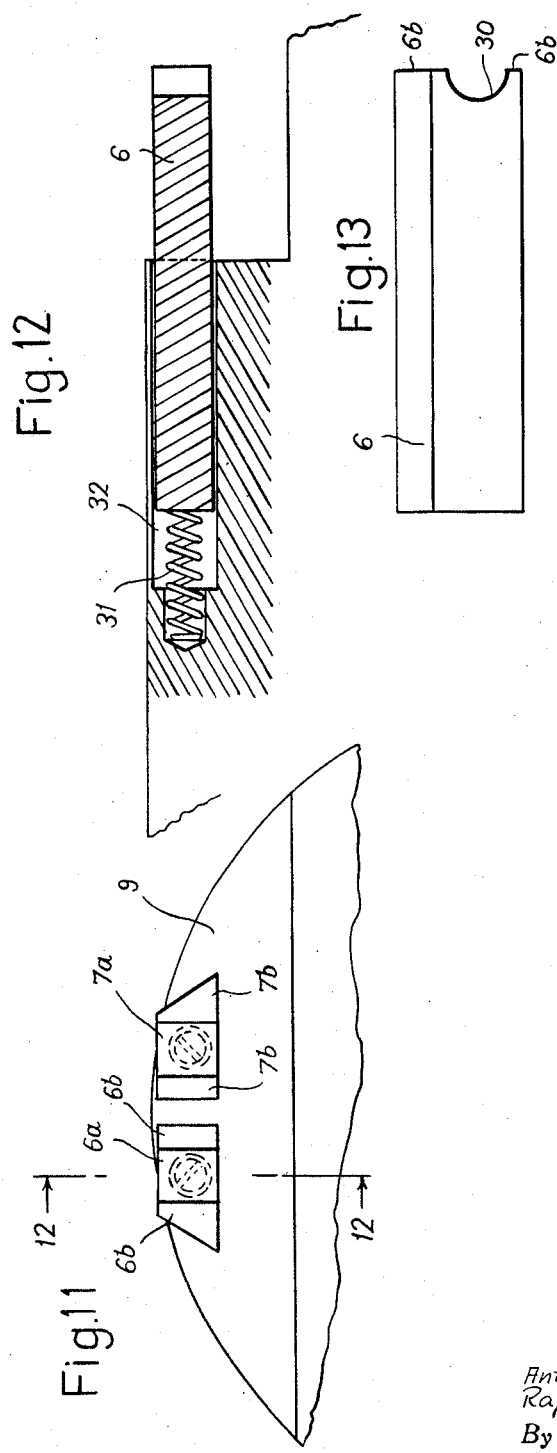

Aug. 5, 1958 A. R. BAFFREY ET AL 2,846,554
BUTT WELDING OF METAL TUBES
Filed Nov. 28, 1955 6 Sheets-Sheet 6

Inventor
Antoine R. Baffrey
Raphael Frumkin
By
Holcombe, Wetherill & Brisebois Attorney

United States Patent Office 2,846,554
Patented Aug. 5, 1958

2,846,554

BUTT WELDING OF METAL TUBES

Antoine Rodolphe Baffrey, Liege, Belgium, and Raphael Frumkin, Paris, France, assignors to Societe Metallurgique Technique et Commerciale, Casablanca, Morocco, a body corporate of Morocco Application November 28, 1955, Serial No. 549,421

Claims priority, application France November 30, 1954

9 Claims. (Cl. 219—8.5)

The present invention relates to the butt welding of metal members by induction, and is directed more particularly towards the longitudinal welding of roughly-shaped tubular members.

It has already been proposed to induce in the facing edges of a roughly-shaped tubular member concentrated currents of high intensity running parallel to these edges, without crossing them, and closing themselves by means of loops of independent secondary currents.

This result is generally achieved by placing a main lead opposite these edges and parallel thereto, through which lead passes a primary current of suitable frequency and of high intensity. This lead forms part of an inductor device which may take various forms and which comprises the leads supplying current to the aforementioned main lead, disposed symmetrically with respect to the plane which passes between the surfaces of the edges to be welded. An inductor of this description has in particular been described and illustrated in the French Patent 1,040,555, filed on November 30, 1948.

The applicants, in the course of their research, have established that when the main lead, usually taking the form of a small bar, is situated opposite the end of the edges, the induced currents become distributed in the mass of the metal with the result that they have no thermal effect, or only a relatively slight effect over a whole sector at the end of the tubular member which consequently cannot reach the welding temperature and does not weld, or welds only imperfectly.

This unwelded portion has to be cut off and is thus wasted. Even though this may not constitute a great disadvantage when a relatively long band or strip metal is being welded, it is a great drawback in the welding of short tubes such as sleeves. A particular case of this kind is the fabrication of tubes with a large diameter and great thickness, from sheet or plate of limited length.

It is therefore an object of the present invention to obtain a perfect weld along the entire length of the edges and thus to produce tubes of high quality without the necessity of wasteful cutting off of the ends.

It is a further object to provide a method by which it is possible to maintain the concentration of the induced currents at the extremities of the line joining the edges of the tube and hence to bring these extremities to the correct welding temperature.

It is another object to provide several types of apparatus or machine enabling the method to be applied in industry.

According to the invention, the edges which have to be welded end to end are artificially extended so that the zone in which there is inadequate concentration of the currents is removed to a position outside the tube.

This result is achieved by means of at least one auxiliary member or finger situated in an extension of the edges and capable of being either welded on to the rough tube or simply attached against its edge.

Once the weld is completed this extension piece is removed, either by cutting, if it has been welded on, or by separating it from the tube if it takes the form of a contact finger.

Since this auxiliary member is of relatively small dimensions the loss of metal represented by its removal is insignificant.

In one method according to the invention, it is possible to use a relatively wide extension piece which extends simultaneously across both edges of the lips of the tubular member.

In another method according to the invention, two extension pieces may be used and placed side by side, each in the closest possible contact with the edge of the corresponding lip of the tube.

Each auxiliary extension piece will serve to increase the path of the concentrated heating current induced in the corresponding lip and at the same time to complete the path of the return current which extends into the lateral part of the tube.

These auxiliary extension pieces will preferably be equal in thickness to that of the lips to be welded. Their width and length will be a function of the induction conditions, more particularly the frequency adopted, the thickness of the material to be welded and its distance from the inductor bar. As a general rule, these two dimensions must be multiples of the depth of penetration of the induced currents.

In another form the dimensions of each auxiliary member will be fixed solely for the passage of the concentrated heating current induced in the corresponding lip, the return current being ensured by means of a supplementary lead connected to the extension piece situated at the other end of the tubular member.

Other conditions which have to be met by these auxiliary members or extension pieces will be pointed out in the following description.

In one type of machine for fabricating sleeves, employing the aforementioned extension pieces, the latter are applied by pressure to the two ends of the tubular bar before it passes under the inductor. The latter may be fixed, in which case the machine will include a carriage for moving the sleeve with its extension pieces at each end; it is also possible to have a mobile inductor which moves on a carriage along a fixed sleeve with its extension pieces.

In order that the invention may be more readily understood, reference will now be made to the accompanying drawings, representing both the preliminary technique and some forms of carrying out the invention in practice, by way of example, and in which:

Figure 1 shows diagrammatically a known method of welding a roughly-shaped tubular member with the inductor placed opposite the end of the tube.

Figure 2 shows the distribution of the lines of the resulting induced currents.

Figure 3 shows diagrammatically the extension pieces applied according to the invention and the modification in the distribution of the lines of current which results.

Figure 4 shows in perspective, one type of mandrel for supporting the extension pieces and pressing them against the end of the tubular bar.

Figure 5 shows a transverse section through these extension pieces and their position in relation to the front surface of the tube.

Figure 6 shows in perspective an inductor of known type, placed over the lips of the tubular member so as to induce heating currents therein.

Figures 7 and 8 represent an elevation and plan, respectively, of a machine for welding sleeves according to the invention and using a mobile inductor which travels along the fixed tube.

Figures 9 and 10 represent an elevation and plan respectively, of another form of sleeve-welding machine according to the invention and in which the mobile sleeve travels in front of a fixed inductor.

Figures 11, 12 and 13 show in greater detail an embodiment of the extension pieces and a method of fixing them in their support; Figure 11 showing a front view of these pieces, Figure 12 representing a section along the line 12—12 of Fig. 11 and Figure 13 showing an extension piece in plan.

In the drawings, the same components have been given the same reference numerals.

Figure 14:
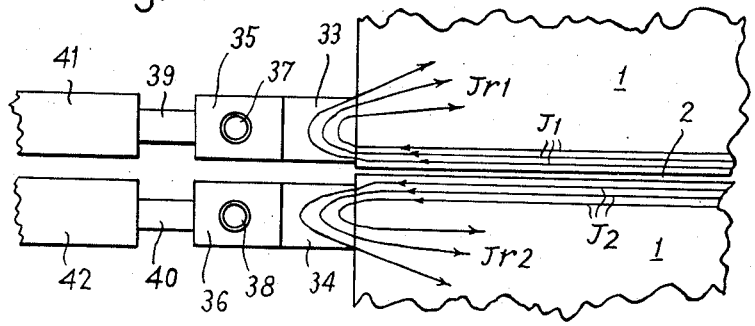
Figure 14 is a diagram of a modification using pivoting supports for the extension pieces, illustrating the distribution of the induced currents by means of lines, the spacing of which indicates the density of the currents.

Figure 1 shows a roughly-shaped tubular member 1 having a circular section, and shaped in such a way that its longitudinal edges constitute a joint line 2, along which these edges have to be butt welded. The edges may touch or they may be separated by a narrow longitudinal gap. Heating of the edges is effected by an inductor comprising a short bar 5 extending parallel to and facing the joint line and supplied by leads 4 connected to a suitable source of current of high or medium frequency. Such an inductor may have the known form shown in Figure 6. The bar 5 is placed so as to overlap the two opposite edges of the tubular member and at a short distance from its surface. This bar fits into the longitudinal slot of a magnet core 12, the pole-pieces of which run parallel to the joint line, each one opposite the corresponding lip of the sleeve. The supply leads 4 are connected to the ends of the bar 5 by members extending vertically in the radial plane passing through the joint line. These vertical members terminate in short horizontal members connected to the source of supply by suitable leads. Every inductor is placed symmetrically in this way in relation to the vertical plane passing through the line of the joint. This arrangement of leads combined with the use of a core results in the induction in the mass of the lips of the tubular bar of two secondary currents J1 and J2, moving in the same direction and being closed by the return paths Jr, as illustrated in Figure 2. Currents J1—J2 are concentrated and ensure preferential heating of the lips to their welding temperature; on the other hand, the lines of the return current Jr spread over all the lateral part of the sleeve and their thermal effect is relatively unimportant. Each of the heating currents is closed along an independent secondary loop (J1—Jr and J2—Jr) and does not cross the line of joint at all. In these circumstances the thermal effect is practically independent of the position of the opposed edges and of their distance apart.

The tubular member 1 travels under the inductor so that the lips are heated throughout their entire length and a forging device, not illustrated, exerts a strong lateral compressive force on the walls as soon as the lips have reached a temperature which renders them plastic, thus welding the lips firmly together.

If desired, an inductor of any other type might be utilised, using the main bar 5 in association with a magnet core concentrating the coupling magnetic flux, this bar being supplied at each end by leads placed symmetrically with regard to the line of the joint.

With such inductors, we have found that the ends of the tubular member do not become welded and it was proved that the reason for this defect lay in the insufficient heating of the corners of zones Z1—Z2. When the inductor is at the end of the tube, the currents are distributed as shown in Figure 2. The concentrated currents J1 and J2, instead of continuing up to the edge of the tube, separate before arriving there and hence are distributed over a much greater width; the effect of the resulting reduction in density is very appreciable lessening of the heating of zones Z1, Z2, which do not reach the temperature for rendering the material sufficiently plastic. These zones either remain just lightly stuck together or they do not join at all so that the end of the tube containing these zones has to be cut off which means a loss of metal, becoming relatively more important as the length of the sleeve decreases.

Figure 16:
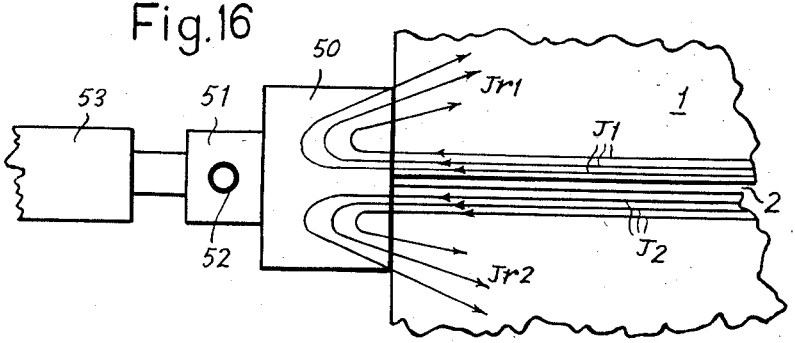
Figure 16 illustrates a modification in which a single extension piece is located in close contact with both lips of the tube at once, and fixed to a swivel-type support.

The invention provides the answer to this drawback by an artificial lengthening of the paths of the concentrated currents J1 and J2 beyond the edge of the sleeve, as illustrated in Figures 3, 14 and 16. This lengthening is effected by means of conductor members 6 and 7 situated in the immediate extension of the two edges of the sleeve. The currents J1 and J2 spread out in the added members only and the effect of concentrated heating is maintained uniformly over the entire length of the lips which weld perfectly at all points, right up to the ends.

These extension pieces should preferably fulfil the following conditions: thickness very nearly equal to that of the edges to be welded; electrical conductivity near, or preferably higher than that of the metal of the tube, at least at its welding temperature; contacting as closely as possible the front wall of the tube so as to reduce to a minimum the resistance to the passage of current; melting point appreciably higher than that of the material of the sleeve. Moreover, the extension pieces must be constructed and disposed in such a way that they do not interfere with the flattening of the edges at the moment of welding.

It has also been found that the width and length of the extension pieces should preferably be a multiple of the depth of penetration of the current into the mass of the metal of the tube, in order to secure the best possible conditions for the entry of the concentrated current and the exit of the return current distributing itself throughout the lateral wall. For an induction frequency of 4,000 Hertz the depth of penetration into the steel by the induced currents is of the order of 8 mm. and the extension pieces 6 and 7 may have, for example, a width and a length of 40 mm., i. e. 5 times this depth of penetration.

Tests have established that tungsten is the most suitable material for making the extension pieces.

The extension pieces can either be welded directly on the tube or applied against its edge under strong pressure and then the pieces will have front faces which are in as close a contact as possible with the edge of the sleeve. In the first-mentioned method, the welded extension pieces must be cut off as soon as welding is finished. The second method, which is more economical, can be carried out by using supports for the extension pieces, allowing them to be applied to the tube during the heating operation and separated when the operation is completed.

To ensure a good contact it is preferable to use two independent extension pieces 6 and 7, separated in such a way that there is a certain longitudinal space between their edges which extend the edges of the lips to be welded. Care must be taken to ensure that this space is greater than the distance between the lips and in particular it must be fixed to allow for a certain flattening of the lips at the moment of forging and must not impede this operation, in the course of which the edges, which are in a plastic state, penetrate into each other and become flattened out, causing a certain amount of steel to flow outwards and towards the interior of the tube where it forms rims.

As shown in Figure 4, the two extension pieces 6 and 7 which are shaped like fingers, are located within slots in a mandrel 8 having a ledge 9 for mounting the fingers. Each of these terminates with the surface which is intended to come into contact with the tube 1 to be welded, as shown by dotted line. In order to ensure a good contact a slot 8a, 7a has been made in each supporting face and this can be seen better in Figure 11; it provides two bearing surfaces 6b—6b and 7b—7b for each finger.

These surfaces are supported against the front wall of the tube 1 which covers the guide 11 and abuts against a ledge 10 in the mandrel 8. The faces 6b and 7b conduct the concentrated heating currents coming from the lips into their respective fingers and from these fingers into the lateral part of the tube. Since the central part of the fingers takes no part in the conduction it can be indented, thus improving the contact with the tube. For the sake of greater clarity the width of the bearing faces 6b and 7b has been reduced in the drawings, but actually it has a thickness several times that of the tubular bar, as has been mentioned earlier. The position of the pieces 6 and 7 with respect to the frontal walls of the tube 1 is seen more clearly in Figure 5. They are placed a little behind the edges of the gap 2 so as not to impede the forging action, as has been said previously. Moreover, the assembly is located in such a manner that it does interfere with the lips of the tube as they are brought close together nor with their flattening out under the compressive lateral force exerted at the moment of forging.

Each extension piece or finger comprises a short member which engages under slight friction in a slot 32 of the mandrel (Fig. 12) and rests against a strong spring 31 which presses the finger against the front of the tubular member. These springs are of a type which ensures a high compression, for example, of the order of 3 kg./mm.$^2$. The fingers are made of tungsten, either entirely or at least the acting tips which rest against the tube and participate in the electric conduction. Under these conditions there is no risk of the fingers being welded against the lips of the tube when they have reached their plastic state at 1300–1400 degrees centrigrade in the case of mild steels. Again, the good conductivity of tungsten in conjunction with the good quality of the contact favour the passage of the currents and maintain a satisfactory heating efficiency.

The sleeve welding machine illustrated in Figures 7 and 8 uses an inductor 4 similar to that shown in Figure 6. This inductor is supported, by means which are not shown, by a mobile carriage 23 with wheels 24 which travel along the rails 29. The carriage is driven by an electric motor 26 which operates toothed pinions 25 engaging with the racks 27. This carriage 23 also supports two pairs of runners 14 and 15, those at 14 maintaining the position of the sleeve 1 to be welded with respect to the inductor and those at 15 ensuring a strong lateral compression on the sleeve in order to weld the lips. The inductor is assumed to move from left to right in the direction of the arrow.

The machine also has at each end a pedestal 21—22, in which are housed the mandrels 8 supporting the contact fingers 6—7. Pedestal 22 is rendered mobile by the pinions 28, engaging with the rack 27.

The tube 1, the edges of which have been bent so that they are face to face, is mounted on the mandrels, the pedestal 22 first being moved aside. Next the position of this pedestal is adjusted to hold the roughly-shaped tubular member and to apply pressure to the contact fingers 6—7 so that they are fixed between the two ends of the tube. The length of the piece projecting from the mandrels 8 is determined so that the inductor can be brought close to the two ends of the sleeve. Operations begin by the carriage with the inductor being placed against the left hand end of the sleeve, current being applied to it, and the lips being heated by induction as described above. As soon as the lips have reached the required state, the runners 15, now under pressure and compressing the lips, secure a perfect weld. The carriage travels from left to right at a speed governed by the thickness of the sleeve, the properties of the inductor and those of the supply current. During the movement of the carriage the runners 14 preserve the shape of the lips and simultaneously maintain their position in relation to the inductor, so as to keep the same conditions of induction.

As soon as the inductor reaches the mandrel 8 which supports the right hand end of the tube the weld is complete and the tube can be removed, moving the pedestal 22 again.

In the machine illustrated in Figures 9 and 10, the inductor 4 is fixed and is mounted, together with the controlling 15 and forging 14 runners, on a stand 16. This inductor is supplied by the assembly 13 comprising the step-down voltage transformer and the tuning circuits which make it possible for the principal induction bar 5 (Fig. 6) to be supplied with a current at high frequency and intensity of the order of several million amperes. The frequency is selected according to the thickness of the sleeve and is more especially in the range between 1000 and 10,000 Hertz for tubes of steel of conventional known composition.

As in the previously described machine, the tube 1 is fitted on to the mandrels 8, supported by pedestals 17. The latter form part of a rigid assembly 21 which moves by means of motors 20 driving pinions 18 engaging with the rack 19. This assembly thus travels from left to right in relation to the inductor and passes the tube progressively in front of the latter, as a result of which the lips become heated and welded.

In the case of fabrication of tubes which are relatively very thick with a large diameter and great weight, it is advantageous to have them supported by one or more cradles spaced along the mounting of the machine; this will relieve the mandrels of excessive bending stress due to the weight of the tube and their function might even be limited to the support of the contact fingers.

In Figure 14, two contact fingers 33 and 34 have been applied under pressure to the front part of the tube 1, using electro-hydraulic compression devices 39—41 and 40—42 of a suitable type. Their pistons 39—40 push the fingers by means of the supports 35—36, articulated respectively at 37—38. The fingers 33—34 are located a little behind the tube edges, forming the joint line 2, thus permitting these edges to flatten out when they weld. The fingers are made of tungsten which has an electrical resistivity at about 1300° C. is about $40 \times 10^6$ ohms/cm., while the resistivity of the steel of the tube is much greater at this temperature.

The heating effect of the ends can be deduced from the distribution of the paths J1—Jr1 and J2—Jr2 of the electric currents induced in the metal of the tube 1. Wherever these paths are dense and uniform the heating is similarly intense and uniform. This method not only secures a strong concentration of the paths in the corners of the tube but also, owing to the good resistivity of the tungsten, even increase this concentration at these points, thus compensating for heat losses due to heat conduction by the contact fingers.

Figure 15:
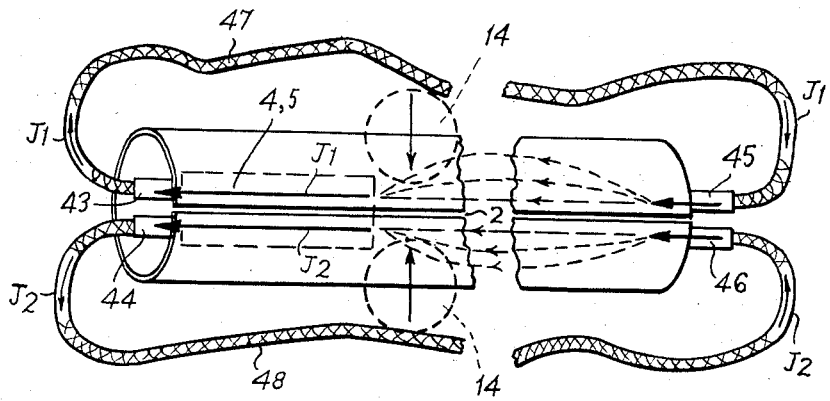
Figure 15 represents a modification in which the extension pieces disposed on the same lip at each end of the tube are connected one to the other by an external lead closing the heating current circuit.

In Figure 15 the electric circuit is lengthened by means of contact fingers 43—44 at one end and 45—46 at the other end of the tube. The fingers 43 and 45, which are attached to the same lip, are connected by a thick-sectioned cable 47 and the fingers 44—46 are connected by the cable 48. Each cable completes the circuit of the induced currents J1, J2 by the inductor 4—5 shown by a dotted line.

These currents are concentrated under the inductor and on the other hand they disperse and spread over the lateral parts of the tube between the return fingers 45—46 and the zone covered by the inductor. The runners 14 ensure the pressure for the forging process. Each finger is traversed by the current once only, so that the contact surface can be reduced and made more effective.

Finally, in Figure 16, there is one single extension piece 50 which is strongly pressed against the wall of the tube 1 by an electro-hydraulic device 53 which supports the extension 50 by means of a member 51 pivoting on an axis 52. The width of the extension piece 50 is fixed so as to extend the closing of the two heating currents J1 and J2, at the same time, the paths of which spread out in the lateral walls along the lines Jr1 and Jr2. In this embodiment the pressure of the extension piece 50 against the edges of the tube must be adjusted so that there is no opposition to the thrust of the runners which perform the forging operation as this force may be very powerful. It would be possible to polish the supporting edges of the tube and also the bearing face of the piece 50 so that, while still ensuring a good contact through pressure between them, there is no obstruction to the relative slipping of the lips of the tube at the moment of the forging operation.

Although, in the embodiments which have been described, the separate extension pieces could also be made in the form of steel lugs welded directly on to the lips and cut off after welding operations, such a variant is impossible with the type shown in Figure 16, where the use of a single welded extension piece would oppose the compression of the lips at the moment of forging.

In the figures the faces in contact, of the fingers and of the tube, are represented as having parallel-plane profiles. They can also be given rounded profiles and, in particular, the spherical face of the finger can be made to fit into notch of corresponding profile made in the lip of the tube. With such a disposition the fingers can be used to prevent any tendency of the tube to turn on itself. The faces in contact will preferably be polished to reduce the flow resistance to the minimum.

It will now be understood that the invention has been described only by way of example, and that various modifications could be made to the specific details set forth without in any way departing from its scope.

We claim:

1. A method for butt welding the opposed lips of a roughly-shaped slit tubular member comprising inducing concentrated longitudinal electric currents of high intensity along said lips, extending the paths of the induced currents beyond the end of said tubular member, and pressing said opposed lips together when the material thereof is in a plastic state.

2. An arrangement for butt welding the opposed lips of a roughly-shaped slit tubular member, comprising means for passing concentrated longitudinal electric currents of high intensity along said lips, means for artificially extending the edges of said lips, and means for pressing said opposed lips together.

3. An arrangement for butt welding the opposed lips of a roughly-shaped slit tubular member, comprising means for inducing concentrated longitudinal electric currents of high intensity along said lips, means for extending the paths of said induced currents beyond the end of said tubular member, and means for pressing said opposed lips together.

4. An arrangement for butt welding the opposed lips of a roughly-shaped slit tubular member, comprising means for passing concentrated longitudinal electric currents of high intensity along said lips, an extension piece located to form an extension of said tubular member beyond an end thereof, means for pressing said extension piece against the inner wall of said tubular member adjacent said slit, and means for pressing said opposed lips together.

5. An arrangement for butt welding the opposed lips of a roughly-shaped slit tubular member, comprising means for passing concentrated longitudinal electric currents of high intensity along said lips, an artificial extension piece welded to the inner wall of said tubular member adjacent said slit, said extension piece extending beyond an end of said tubular member, and means for pressing said opposed lips together.

6. An arrangement for butt welding the opposed lips of a roughly-shaped slit tubular member, comprising means for passing concentrated longitudinal electric currents of high intensity along said lips, two extension pieces located to form extensions of said tubular member beyond an end thereof, means for pressing said extension pieces against the inner wall of said tubular member one on each side of said slit, and means for pressing said opposed lips together.

7. An arrangement for butt welding the opposed lips of a roughly-shaped slit tubular member, comprising means for passing concentrated longitudinal electric currents of high intensity along said lips, a mandrel having an end of reduced diameter, a cut-away portion at the end of said mandrel that includes said portion of reduced diameter, two extension pieces located on said mandrel and suspended to be located above said cut-away portion and spaced apart longitudinally, said portion of reduced diameter forming a stop for an end of said tubular member, and means for pressing said opposed lips together.

8. A slit-sleeve welding machine comprising a fixed mounting for supporting the sleeve, an inductor device, means for causing said inductor to travel longitudinally of said sleeve adjacent its slit, at least one extension member located in contact with the inside wall of said sleeve adjacent said slit and extending beyond an end of said sleeve, and means for causing the opposed edges of said slit to be moved into mutual contact.

9. A slit-sleeve welding machine comprising a fixed inductor device, means for causing said sleeve to travel longitudinally relative to said inductor device with said slit adjacent said inductor device, at least one extension member located in contact with the inside wall of said sleeve adjacent said slit and extending beyond an end of said sleeve, and means for causing the opposed edges of said slit to be moved into mutual contact.

References Cited in the file of this patent

UNITED STATES PATENTS

| | | |
|---|---|---|
| 1,512,787 | Morton | Oct. 21, 1924 |
| 1,903,359 | Sessions | Apr. 4, 1933 |
| 1,986,370 | Sessions | Jan. 1, 1935 |
| 2,086,305 | Sessions | July 6, 1937 |
| 2,483,973 | Goettings | Oct. 4, 1949 |

FOREIGN PATENTS

| | | |
|---|---|---|
| 644,821 | Great Britain | Oct. 18, 1950 |
| 1,040,555 | France | May 27, 1953 |